(12) United States Patent
Bhogi et al.

(10) Patent No.: US 8,145,759 B2
(45) Date of Patent: Mar. 27, 2012

(54) DYNAMICALLY CONFIGURABLE RESOURCE POOL

(75) Inventors: Sankara R. Bhogi, Bangalore (IN); Ajay Kumar, Bangalore (IN); Bala Dutt, Bangalore (IN); Venugopal Rao K, Karnataka (IN); Srinivasan Kannan, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 2738 days.

(21) Appl. No.: 10/287,324

(22) Filed: Nov. 4, 2002

(65) Prior Publication Data

US 2004/0088413 A1 May 6, 2004

(51) Int. Cl.
*G06F 15/173* (2006.01)

(52) U.S. Cl. .................................... 709/226

(58) Field of Classification Search .............. 709/226, 709/217, 220, 223; 718/106
See application file for complete search history.

(56) References Cited

U.S. PATENT DOCUMENTS

| | | | |
|---|---|---|---|
| 4,502,116 A | 2/1985 | Fowler | |
| 5,335,343 A | 8/1994 | Lampson et al. | |
| 5,504,899 A | 4/1996 | Raz | |
| 5,504,900 A | 4/1996 | Raz | |
| 5,586,312 A | 12/1996 | Johnson et al. | |
| 5,630,081 A | 5/1997 | Rybicki et al. | |
| 5,701,480 A | 12/1997 | Raz | |
| 5,764,915 A * | 6/1998 | Heimsoth et al. | 709/227 |
| 5,795,228 A | 8/1998 | Trumbull | |
| 5,928,323 A * | 7/1999 | Gosling et al. | 709/203 |
| 5,983,225 A | 11/1999 | Anfindsen | |
| 5,983,326 A | 11/1999 | Hagersten et al. | |
| 5,991,792 A * | 11/1999 | Nageswaran | 718/102 |
| 6,011,791 A | 1/2000 | Okada et al. | |
| 6,038,587 A | 3/2000 | Phillips et al. | |
| 6,041,354 A * | 3/2000 | Biliris et al. | 709/226 |
| 6,105,067 A * | 8/2000 | Batra | 709/227 |
| 6,154,787 A * | 11/2000 | Urevig et al. | 710/8 |
| 6,157,927 A | 12/2000 | Schaefer et al. | |
| 6,233,587 B1 | 5/2001 | Tandon | |
| 6,243,717 B1 | 6/2001 | Flanagan et al. | |
| 6,272,675 B1 | 8/2001 | Schrab et al. | |

(Continued)

OTHER PUBLICATIONS

Liu et al., "Designing a Test Suite for Empirically-based Middleware Performance Prediction," Australian Computer Society, Inc., (2002), (8 Pages).

"Java™ 2SDK, Enterprise Edition 1.3.1 Configuration Guide," http://java.sun.som/j2ee/sdk_1.3/techdocs/release/ConfigGuide.html, Jan. 3, 2002, ('16 Pages).

(Continued)

*Primary Examiner* — Douglas Blair
*Assistant Examiner* — Bradford F Fritz
(74) *Attorney, Agent, or Firm* — Robert C. Kowert; Meyertons, Hood, Kivlin, Kowert & Goetzel, P.C.

(57) ABSTRACT

A dynamically configurable resource pool may provide a pool of computing resource for use in a computing system or application, such as a connection pool or a thread pool for server systems such as application and web server systems. In one embodiment, a server may include a resource pool configured to provide a plurality of computing resources. Other components in the server may be configured to request use of one of the computing resources from the connection pool. The resource pool may include a resource pool manager configured to service requests for the computing resources. The resource pool manager may manage configuration of the resource pool. The resource pool manager may also be configured to receive a configuration change request to change the configuration of the resource pool while the resource pool is available for use.

48 Claims, 10 Drawing Sheets

U.S. PATENT DOCUMENTS

| | | | |
|---|---|---|---|
| 6,279,001 B1 * | 8/2001 | DeBettencourt et al. | 1/1 |
| 6,317,773 B1 | 11/2001 | Cobb et al. | |
| 6,338,112 B1 * | 1/2002 | Wipfel et al. | 710/269 |
| 6,374,243 B1 | 4/2002 | Kobayashi et al. | |
| 6,405,317 B1 | 6/2002 | Flenley | |
| 6,411,956 B1 | 6/2002 | Ng | |
| 6,421,661 B1 | 7/2002 | Doan et al. | |
| 6,421,688 B1 | 7/2002 | Song | |
| 6,442,618 B1 | 8/2002 | Phillips et al. | |
| 6,496,828 B1 | 12/2002 | Cochrane et al. | |
| 6,519,679 B2 | 2/2003 | Devireddy et al. | |
| 6,615,265 B1 * | 9/2003 | Leymann et al. | 709/227 |
| 6,651,125 B2 * | 11/2003 | Maergner et al. | 710/244 |
| 6,687,729 B1 * | 2/2004 | Sievert et al. | 718/102 |
| 6,687,831 B1 | 2/2004 | Albaugh et al. | |
| 6,704,737 B1 | 3/2004 | Nixon et al. | |
| 6,728,958 B1 | 4/2004 | Klein et al. | |
| 6,832,238 B1 | 12/2004 | Sharma et al. | |
| 6,854,646 B2 | 2/2005 | Ieshima et al. | |
| 6,862,573 B2 | 3/2005 | Kendall et al. | |
| 6,873,995 B2 | 3/2005 | Benson | |
| 6,950,848 B1 | 9/2005 | Yousefizadeh | |
| 6,981,221 B2 | 12/2005 | Neudeck et al. | |
| 7,065,563 B2 * | 6/2006 | Islam et al. | 709/220 |
| 7,080,119 B2 | 7/2006 | Felt et al. | |
| 7,082,432 B2 | 7/2006 | Bhogi et al. | |
| 7,089,566 B1 | 8/2006 | Johnson | |
| 7,134,008 B2 | 11/2006 | Dutt et al. | |
| 7,165,061 B2 | 1/2007 | K et al. | |
| 7,181,509 B2 * | 2/2007 | Soejima et al. | 709/221 |
| 2002/0065915 A1 * | 5/2002 | Anderson et al. | 709/225 |
| 2002/0083078 A1 | 6/2002 | Pardon et al. | |
| 2002/0124083 A1 | 9/2002 | Jeyaraman et al. | |
| 2003/0033398 A1 | 2/2003 | Carlson et al. | |
| 2003/0036919 A1 | 2/2003 | Felt et al. | |
| 2003/0046342 A1 | 3/2003 | Felt et al. | |
| 2003/0055968 A1 * | 3/2003 | Hochmuth et al. | 709/226 |
| 2004/0030739 A1 | 2/2004 | Yousefizadeh | |
| 2004/0088573 A1 * | 5/2004 | Jeyaram | 713/201 |
| 2004/0153349 A1 | 8/2004 | K. et al. | |
| 2004/0153383 A1 | 8/2004 | K. et al. | |
| 2004/0153450 A1 | 8/2004 | K. et al. | |
| 2004/0172385 A1 | 9/2004 | Dayal | |
| 2004/0215473 A1 | 10/2004 | Bhogi et al. | |
| 2004/0215894 A1 | 10/2004 | Bhogi et al. | |
| 2004/0216109 A1 | 10/2004 | Bhogi et al. | |
| 2005/0015353 A1 | 1/2005 | Kumar et al. | |
| 2005/0015425 A1 | 1/2005 | Kumar et al. | |
| 2005/0055325 A1 | 3/2005 | Dutt et al. | |
| 2005/0066155 A1 | 3/2005 | Dutt et al. | |

OTHER PUBLICATIONS

Ellis et al., :JDBC™ 3.0 Specification—Final Release, Sun Microsystems, Inc., Oct. 2001, (190 pages).

"iPlanet Application Server 6.0 Administration Guide: Chapter 4 Logging Server Messages," http://docs.sun.com/source/816-5720-10/adlog.htm, Sep. 5, 2000, (21 Pages).

"JDBC™ Data Access API—The JDBC API Universal Data Acess for the Enterprise," java.sun.com, Aug. 10, 2003, (5 Pages).

"Connection Pooling," Advanced Programming for the Java 2 Platform, Aug. 16, 2002, (4 Pages).

Siva Visveswaram, "Manage Access to Shared, Server-Side Resources for High Performance—Dive Into Connection Pooling with J2EE," JavaWorld, Oct. 2000, (8 Pages).

"Interface DataSource," DataSource (Java 2 Platform, SE v1.4.1), 2002, (1 Page).

"Initial Context," JNDI 1.2.1 Specification: Class Initial Context, http://java.sun.com/products/jndi/1.2/javadoc/javax/naming/InitialContext.html, Jul. 14, 1999, (1 Page).

JNDI—Java™ Naming & Directory Interface™, Sun Microsystems, Inc., http://java.sun.com/jndi, May 15, 2003, (2 Pages).

"iPlanet Application Server 6.0 Administration Guide: Chapter 9 Administering Transactions," http://docs.sun.com/source/816-5784-10/adtrans.htm, Sep. 5, 2000, (11 Pages).

Breitbart et al., "Replication and Consistency Being Lazy Helps Sometimes," PODS '97, Jun. 1997, (pp. 173-184).

Patricia Serrano-Alvarado et al."Mobile Transaction Supports for DBMS". In 17ièmes Journées Bases de Données Avancées, Agadir, Maroc, Oct. 2001, (19 Pages).

Efficient and Flexible Methods for Transient Versioning of Records to Avoid Locking by Read-Only Transactions, 1992 ACM SIGMOD, Jun. 1992, (pp. 124-133).

BEA WebLogic Enterprise 5.1, BEA Systems, Inc., 2000, (13 Pages).

"Simplified Guide to the Java TM 2 Platform Enterprise Edition," Sun Microsystems, Inc., 1999, (13 Pages).

Dogac et al., "METU Interoperable Database System," Demo Description, in Proc. of ACM Sigmod Intl. Conf. on Management of Data, Jun. 1996, (6 Pages).

Oracle9i JDBC Developer's Guide and Reference (Mar. 2002, retrieved from http://www.stanford.edu/dept/itss/docs/oracle/9i/Java.920/a96654/toc.htm on Sep. 6, 2005).

Kannegaard (J2EE BluePrints, Mar. 20, 2000 retrieved from http://java.sun.com/blueprints/guidelines/designing_enterprise_applications/apmTOC.html on Sep. 6, 2005).

Manolis Marazakis, Distributed Systems, Univ. of Crepe, Sep. 2002, pp. 1-31.

* cited by examiner

DYNAMICALLY CONFIGURABLE RESOURCE POOL

BACKGROUND OF THE INVENTION

1. Field of the Invention

This invention relates to computer systems, and more particularly to resource pool management in computer systems.

2. Description of the Related Art

A three-tier application is an application that may be organized into three major parts, each of which may be distributed within a networked computer system. The three parts (tiers) may include: one or more clients, one or more servers, and one or more back-end systems (e.g. databases) along with their management functions. In the first tier, a client may be a program running on a user's computer that includes a graphical user interface, application-specific entry forms, and/or interactive windows for interacting with an application. An exemplary client may be a web browser that allows a user to access the Internet. In the second tier, a server may be a program such as an application server that contains the business logic for an application such as banking transactions or purchasing merchandise for the user of a client. The server may be running on one or more computers.

A plurality of client systems may connect to one or more servers as components of a network. An exemplary network of this type is the Internet. Clients may submit requests for data to servers, and if the requested data is available within the server, the server may respond by returning the requested data to the client. When the data requested by a client is not available within a server, a component of the server (requester) may request the data on the behalf of the client from a backend system. This request may require the establishment of a connection between the server and the backend system. A connection is a set of computer system resources and parameters, which allow communications between two or more entities within the system. For example, computers A and B may be components of a computer system, which includes several computers linked together by a communications network. An application running on computer A may reach a point in its execution where it requires data, which is resident on computer B. At this point the application will request that a connection be established between computers A and B whereby, it may obtain the necessary data. In general, some agent within computer A may allocate resources, such as computer memory and buffers, to support the communication and send a message to computer B informing it that a connection is desired. Upon receiving this message, an agent in computer B may allocate resources in computer B to support the communication. At this point a negotiation may take place between the agents in computers A and B, which may include the exchange of several messages. This negotiation may result in a set of parameters, which govern the communication between A and B. These parameters may include: how much data may be sent at one time, what format the data may be in, what to do if an errors during transmission, etc. Depending upon the complexity of the computer system, the negotiations to establish a connection may consume a significant amount of time.

The third tier of a three-tier application may include one or more backend systems. A backend system may include one or more databases and programs that facilitate access to the data they contain. In some implementations of three-tier applications, the number of clients initiating requests for data may be, and therefore the number of data requests generated may be quite large. Correspondingly, the number of connections between the server and the backend systems needed to fulfill these requests may be quite large. The overhead associated with establishing a connection between the server and backend system may constitute a significant portion of the response time for a request from a client. To reduce the overhead associated with establishing new connections, a server may maintain a pool of pre-established connection, e.g. a connection pool. By the incorporation of a connection pool, the server may be able to significantly reduce response times. When an application component receives a request for data from a client, it may first determine on what backend system and/or in which database the requested information resides. It may then send a request for a connection to the specific backend system to the connection pool. A connection pool manager may then determine if a connection to the specified backend system is available. If such a connection is available, the connection pool manager may supply the connection to the requestor and the requester may then be able to obtain the needed data for the client without incurring the overhead of establishing the connection.

Management of a connection pool may involve an attempt to balance the capacity to fulfill requests for connections with limitations on server resources that may be allocated for the connection pool. It may be desirable to have sufficient connections in the connection pool such that all requests for connections may be fulfilled without the need to establish any new connections. In complex systems where the number of backend entities is great, the number of connections and computer resources needed to support them may exceed the total resources available to the server in which the connection pool is running. Therefore, it may be necessary to limit the number of connections in the connection pool. Given a limitation on resources that may be devoted to the connection pool, it may be desirable to implement a set of connections corresponding to the most frequent connection requests received by the connection pool. It may be that the frequency distribution of requests for connections varies as a function of parameters such as time of day, so that a connection pool containing a set of connections optimized to meet the connection demands of morning clients may be quite different from a set optimized for evening clients.

In order to achieve higher levels of economy of server resources, it may be necessary to be able to change (reconfigure) the connection pool to meet changing demands for connections. Changing the configuration of the connection pool (e.g. to change the pool size or other parameters) may require destroying the pool and reinitializing it with new parameters. This procedure may also entail rebooting the computer on which the connection pool resides. Therefore, reconfiguring a connection pool may require the destruction of all connections within the pool at a minimum. For complex systems with a large number of clients, there may be no time at which one or more connections are not in use. Reconfiguring the connection pool may disrupt service to any clients that are currently using connections. This disruption of client services may be of significant duration, particularly if a reboot of the application server is required.

SUMMARY OF THE INVENTION

Embodiments of a dynamically configurable resource pool are described. In some embodiments, the dynamically configurable resource pool may provide a pool of computing resource for use in a computing system or application, such as a connection pool or a thread pool for server systems such as application and web server systems.

In one embodiment, a server may include a resource pool configured to provide a plurality of computing resources.

Other components in the server may be configured to request use of one of the computing resources from the connection pool. The resource pool may include a resource pool manager configured to service requests for the computing resources. The resource pool manager may manage configuration of the resource pool. The resource pool manager may also be configured to receive a configuration change request to change the configuration of the resource pool while the resource pool is available for use. The resource pool manager may determine if the resource is at a safe point for the configuration change request to be implemented. For example, the resource pool manager may dynamically evaluate the configuration change request based on current usage of the resource pool to determine the impact of implementation of the requested configuration change on the current usage of the resource pool. If the resource pool manager determines that the resource is not at a safe point for the configuration change request to be implemented, the resource pool manager may delay implementation of the requested configuration change until the resource pool is at a safe point for the configuration change to take effect. For example, if implementation of the requested configuration change would disrupt usage of the resource pool, the resource pool manager may delay implementation of the requested configuration change until the configuration change can be implemented without disrupting usage of the resource pool. Once the resource pool is at a safe point for the configuration change to take effect, the resource pool manager may asynchronously change the resource pool configuration while the resource pool is still available for use.

In one embodiment, a dynamically configurable resource pool may be a connection pool that services requests for connections to a backend system resource. Upon receiving a request, the main unit may determine if a connection is available in the pool. Different dynamically configurable resource pools may be provided for different types of connections, e.g. to different backend resources. If an unassigned connection exists in the requested pool, the main unit may assign the connection to the requester. Furthermore, if an unassigned connection does not exist in the pool, and the current pool size is less than the maximum pool size, then the main unit may establish a connection and assign the connection to the requester. If an unassigned connection does not exit in the pool, and the current pool size is equal to the maximum pool size, then the wait queue unit may place the request for connection on the wait queue and monitor connection usage for the return of connections to the pool. When a connection is returned to the connection pool, the connection pool manager may once again determine if an unassigned connection exists in the pool to satisfy a pending request.

In one embodiment, the connection pool manager may be segmented into a main unit for responding configuration requests, connection requests, and requests for current pool usage statistics; a wait queue unit for managing connection requests for which a connection is not currently available, and a statistics unit for responding to requests for cumulative pool usage statistics. The main, wait queue, and statistics units may be configured to be locked separately in order to synchronize concurrent requests for service to the connection pool. This separate locking capability of connection pool management components may increase system performance in a multi-threaded environment. For example, a thread A may issue a request for service to the connection pool, and concurrently a thread B may also issue a request for service to the connection pool. If the connection pool were configured to be locked as a unit, the request issued by thread A would lock the connection pool while it is being serviced. Thread B would attempt to lock the connection pool for it's own service request, but would have to wait until the pool finishes servicing the request of thread A to obtain the lock. The capability to lock connection pool manager components independently may allow the connection pool to handle multiple requests for service concurrently. Referring to the previous example, thread A may issue a connection request and lock the main unit and its associated resources. Concurrently, thread B may issue a cumulative statistics request and lock the statistics unit and its associated resources. Because the main unit and statistics unit may be locked independently, the two service requests can be fulfilled concurrently thus improving system performance.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS OF THE INVENTION

Figure 1:
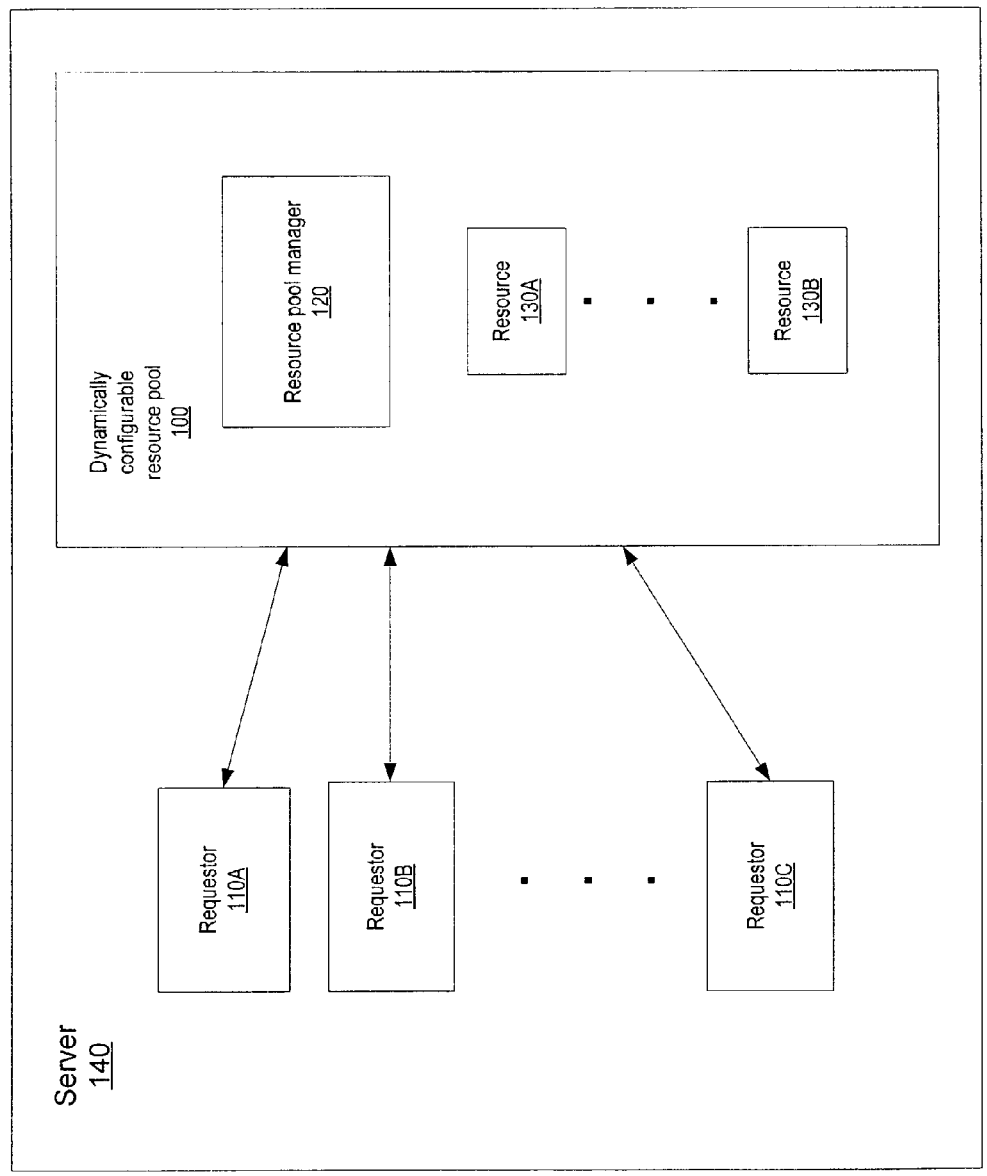
FIG. 1 illustrates a server including a dynamically configurable resource pool, according to one embodiment.

FIG. 1 illustrates one embodiment of a dynamically configurable resource pool 100 as a component of a server 140. The server 140 may be a program running on a computer system that provides services to other computer programs running on the same or other computer systems. A requestor 110 may be another component of the server 140 that may make use of one or more of the resources 130 managed by the resource pool 100. In order to obtain the required resource 130, the requester 110 sends a request to the resource pool 100. The resource pool manager 120 may service resource requests by supplying requested resources 130 and may manage the return of resources to the pool 100. In one embodiment the resources 130 may be connections to other resources or computer systems, such as a data resource provided by a database resource manager. In such embodiments in which the resources are connections, the dynamically configurable resource pool 100 may be referred to as a dynamically configurable connection pool. In another embodiment the resources may be threads such that dynamically configurable resource pool 100 may be referred to as a dynamically configurable thread pool.

The resource pool manager 120 may be capable of altering one or more aspects of the configuration of the resource pool 100 in response to a configuration request. Furthermore, the resource pool manager 120 may be able to alter the configuration of the resource pool 100 while the resources 130 of the pool are available for use, without disrupting this use. Thus, resource pool 100 may be dynamically configurable. In one embodiment, a requestor 110 may generate a request to change the configuration of the resource pool 100. The change may be to reduce the maximum number of resources 130 in the pool 100, for example. Upon receiving a configuration change request, the resource pool manager may determine whether or not the configuration change may be safely implemented at the current time. For, example, upon receiving a request to reduce the maximum number of resources 130 in the pool 100, the resource pool manager 120 may check current statistics on resource pool usage, in particular it may check the total number of resources 130 in use. It may then compare the requested maximum number of resources 130 with the total number of resources currently in use. If the total number of resources 130 currently in use is less than or equal to the requested maximum number of resources, then the resource pool manager 120 may reduce the maximum resource pool size to the requested value without disrupting the current utilization of pool resources 130. If the total number of resources 130 currently in use is greater than the requested maximum number of resources, then the resource pool manager 120 may delay the implementation of the requested reduction in the maximum number of resources in the pool 100 until such time as current resource usage becomes less than or equal to the requested maximum number of resources for the pool thereby avoiding disruption of pool usage.

Figure 2:
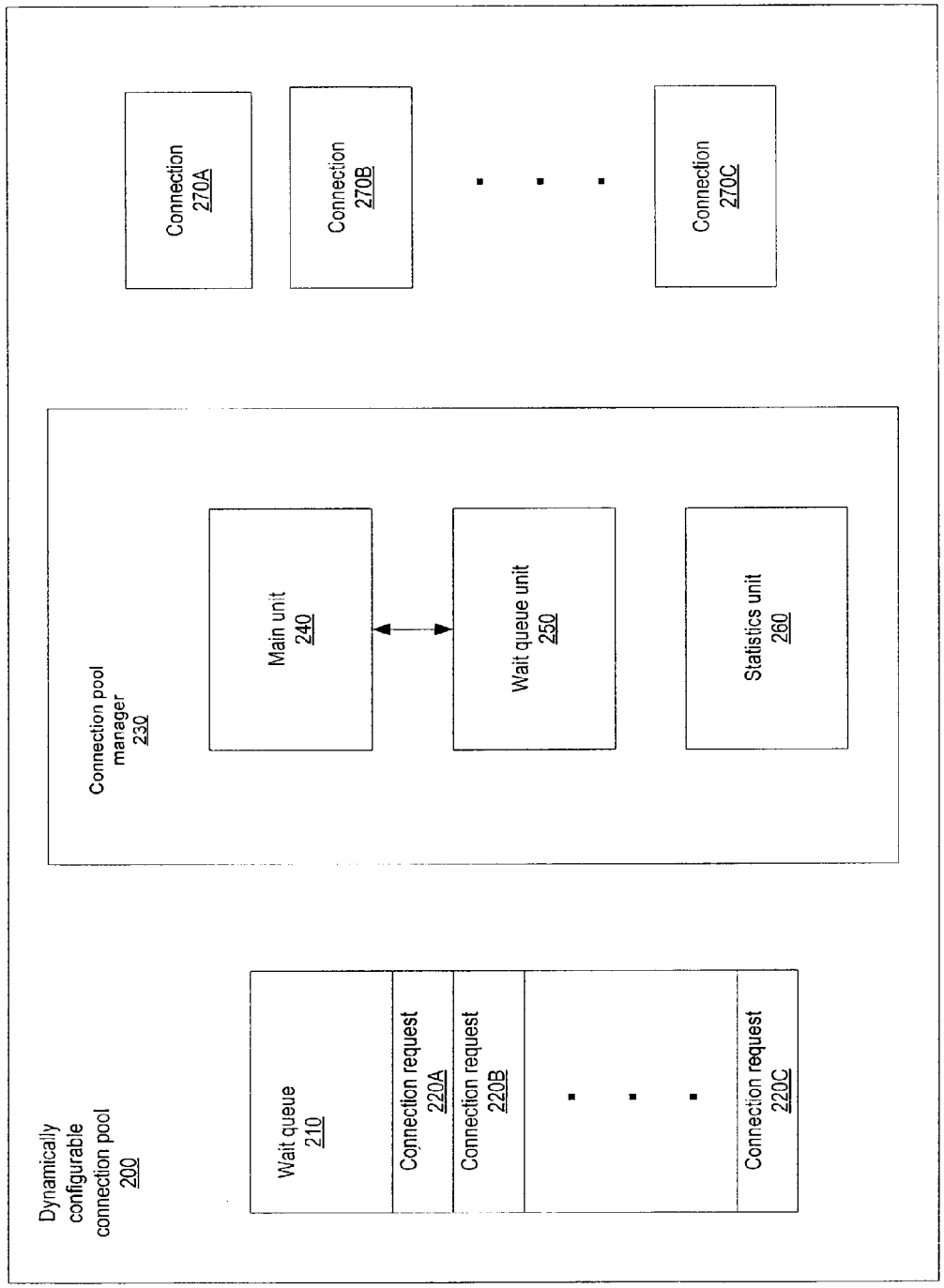
FIG. 2 illustrates an embodiment of a dynamically configurable connection pool.

In one embodiment, the resources 130 managed by a dynamically configurable resource pool 100 may be connections 270. FIG. 2 illustrates a dynamically configurable connection pool 200. A connection 270 may involve computer system resources and parameters, which allow communications between two or more entities within the system. In one embodiment, computers A and B may be components of a computer system, which includes several computers linked together by a communications network. An application running on computer A may reach a point in its execution where it requires data, which is resident on computer B. At this point the application will request that a connection 270 be established between computers A and B whereby, it may obtain the necessary data. In general, some agent within computer A may allocate resources, such as computer memory and buffers, to support the communication and send a message to computer B informing it that a connection 270 is desired. Upon receiving this message, an agent in computer B may allocate resources in computer B to support the communication. At this point a negotiation may take place between the agents in computers A and B, which may include the exchange of several messages. This negotiation may result in a set of parameters, which govern the communication between A and B. These parameters may include: how much data may be sent at one time, what format the data may be in, what to do if an errors during transmission, etc.

Depending upon the complexity of the computer system, the negotiations to establish a connection 270 may consume a significant amount of time. Therefore, if communications between the entities for which a connection 270 is established occur frequently, it may be advantageous to maintain the connection after its immediate use has been completed in order that it may be reused without incurring the overhead associated with reestablishing the connection.

A group of these reusable connections 270 may be managed within a connection pool 200. The connection pool 200 may include the connections 270 themselves along with a connection pool manager 230. The connection pool manager 230 may be responsible for responding to all requests for service received by the connection pool 200. Requests for service received by the connection pool 200 may be grouped into those dealing with the connections 270 themselves, those dealing with statistics of pool usage, and those dealing with the configuration of the pool 200. The connection pool manager 230 may include a main unit 240 for responding to configuration requests, connection requests, and requests for current pool usage statistics.

Configuration requests may include requests to view the pool configuration, requests to change the pool configuration, requests to destroy the pool 200, and requests to flush the pool. In response to a request to view the pool configuration, the main unit 240 may provide one or more values for pool configuration parameters. In response to a request to change the pool configuration, the main unit 240 may employ a dynamic configuration change mechanism to safely change one or more values of pool configuration parameters, as further described below. In response to a request to destroy the pool, the main unit 240 may delete all components of the connection pool 200. In response to a request to flush the connection pool 200, the main unit 240 may destroy the connections 270 currently in the pool and not in use.

Connection requests may include requests to obtain a connection 270 from the connection pool 200 and requests to return a connection to the connection pool. In response to a request to obtain a connection 270, the main unit 240 may assign a connection to the requester 110. In response to a request to return a connection 270 to the pool 200, the main unit 240 may make the connection available in the pool for reassignment.

The main unit 240 may respond to a request for current connection pool statistics by providing current values for one or more connection pool usage parameters. Connection pool usage parameters may include total number of connections in the pool, total number of connections in use, and wait queue size, for example.

The connection pool manager 230 may include a wait queue unit 250 for managing connection requests for which a connection is not currently available. If the main unit 240 is unable to immediately fulfill a request 220 for a connection, it may pass the request to the wait queue unit 250. The wait queue unit 250 may place the request 220 on the wait queue 210. The wait queue unit 250 may monitor connections 270 returned to the connection pool 200. When a connection 270 matching a stored request 220 becomes available, the wait queue unit 250 may assign the connection to the requester 110.

The connection pool manager 230 may include a statistics unit 260 for responding to requests for cumulative pool usage statistics. Requests for cumulative pool usage statistics may include requests to start accumulating data for one or more cumulative statistics, stop accumulating data for one or more cumulative statistics, and view one or more cumulative statistics. In response to a request to start accumulating data for one or more cumulative statistics, the statistics unit 260 may initialize a portion of computer memory to store data associated with the one or more cumulative statistics. In response to a request to stop accumulating data for one or more cumulative statistics, the statistics unit 260 may release that portion of computer memory used to store data associated with the one or more cumulative statistics. In response to a request to view one or more cumulative statistics, the statistics unit 260 may perform any calculations needed to obtain current values for the one or more cumulative statistics and provide those current values to the requester.

Figure 3:
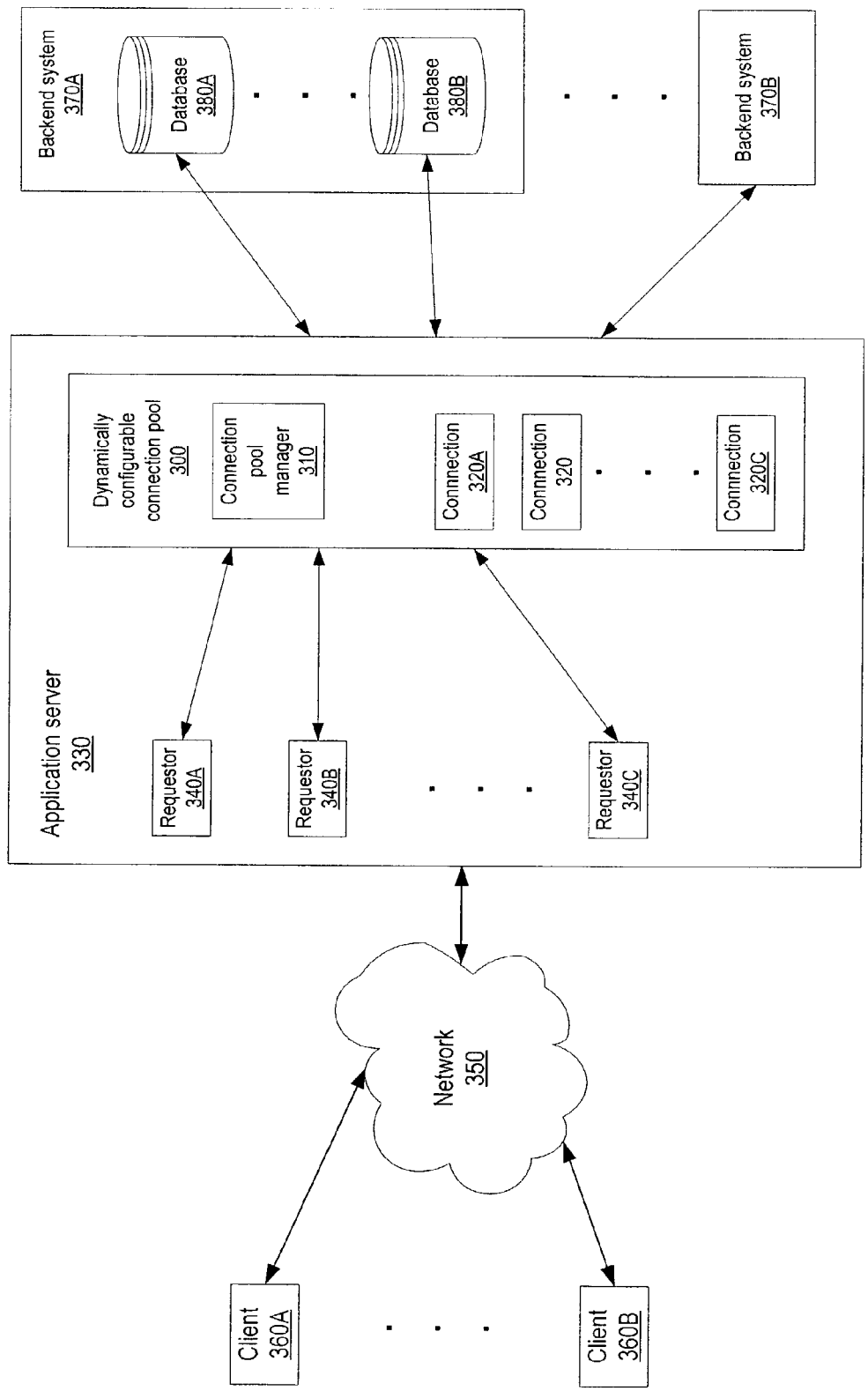
FIG. 3 illustrates one embodiment of a dynamically configurable connection pool as a component of an application server in a three-tier application.

FIG. 3 illustrates one embodiment of a dynamically configurable connection pool 300 as a component of an application server 330 in a three-tier application. A three-tier application is an application that may be organized into three major parts, each of which may be distributed within a networked computer system. The three parts (tiers) may include: one or more clients 360, one or more servers 330 (e.g. web servers and/or application servers), and one or more backend systems 370 which may contain one or more databases 380 along with their management functions. In the first tier, a client 360 may be a program running on a user's computer that includes a graphical user interface, application-specific entry forms, and/or interactive windows for interacting with an application. An exemplary client 360 may be a web browser that allows a user to access the Internet.

In the second tier, a server 330 may be a program that provides the application logic, such as a service for banking transactions or purchasing merchandise for the user of a client 360. The server 330 may be running on one or more computers. One or more client systems may be connected to one or more server systems as components of a network 350. An exemplary network 350 of this type is the Internet. Clients 360 may submit requests to server 330. Satisfying a request may involve accessing certain data. When data accessed in response to a client request is not available within server 330, a component of the server (requester) 340 may request the data from a backend system 370. The requester may be a component of the application, such as an enterprise Java bean (EJB). This request may require the establishment of a connection 310 between the server 330 and the backend system 370. The backend system 370 may include one or more databases 380 and programs that facilitate access to the data they contain. A connection between the server 330 and a backend database 380 may be referred to as a database connection.

The third tier of a three-tier application may include one or more backend systems 370. In some implementations of three-tier applications, the number of clients 360 initiating requests for data, and therefore the number data requests themselves may be quite large. Correspondingly, the number of connections 320 between the server 330 and the backend systems 370 needed to fulfill these requests may be quite large. The overhead associated with establishing a connection 320 between the server 330 and backend system 370 may constitute a significant portion of the response time for a request from a client 360. By the incorporation of a dynamically configurable connection pool 300, the server 330 may be able to significantly reduce response times.

When an application component receives a request from a client, it may determine on what backend system 370 and/or in which database 380 the data needed to satisfy the request resides. It may then send a request for a connection with the specific backend system 370 to the dynamically configurable connection pool 300. The connection pool manager 310 may then determine if a connection 320,to the specified backend system 370 is available. If such a connection 320 is available, the connection pool manager 310 may supply the connection to the requestor 340 and the requestor may then be able to obtain the needed data for the client 360 without incurring the overhead of establishing the connection. To efficiently meet changing demands for connections, the configuration (size, max wait time, etc.) of the connection pool 300 may be altered while one or more connections are in use. This dynamically configurable aspect of the connection pool 300 is described in greater detail below. In one embodiment, different dynamically configurable connection pools 300 may be provided for different types of connections.

Although an embodiment has been described in which a dynamically configurable connection pool is implemented within an application server, other embodiments may include a dynamically configurable pool(s) for other types of computing resources within other types of systems.

Figure 4:
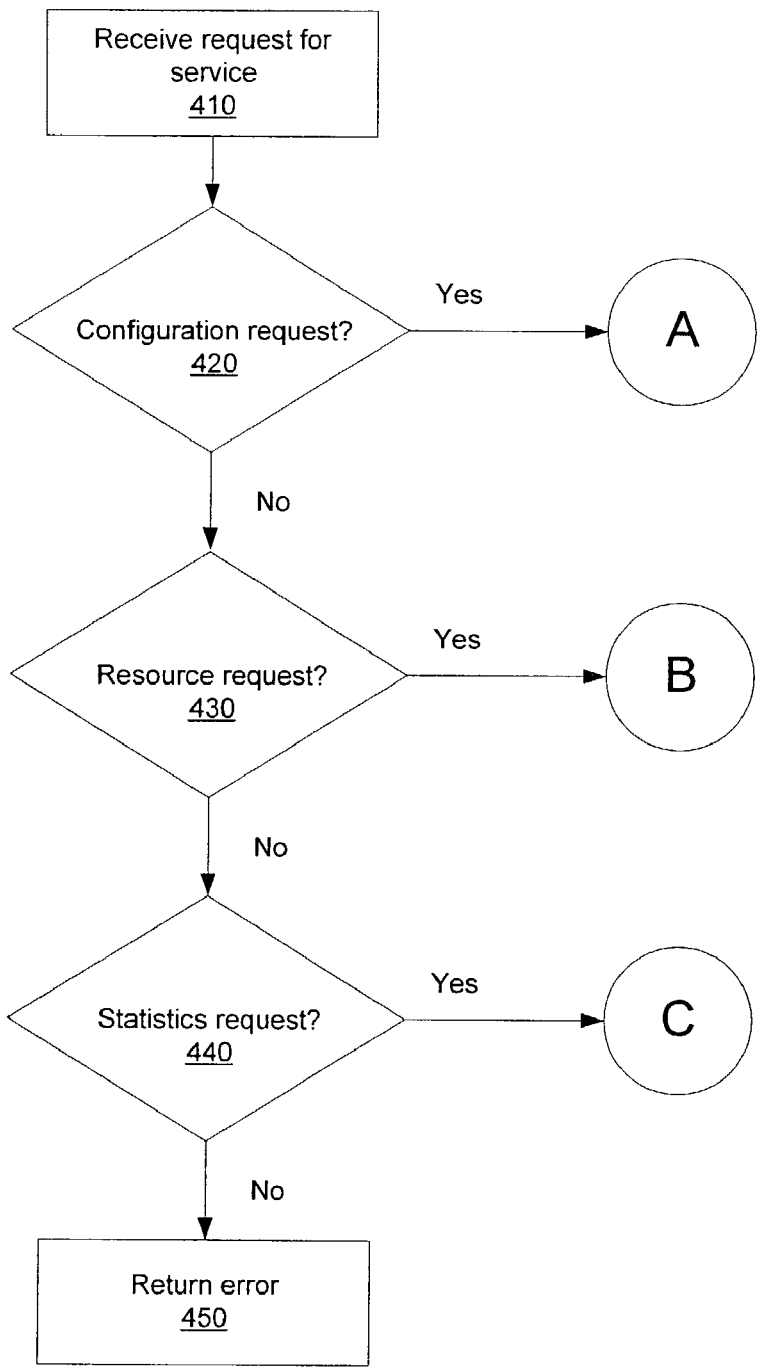
FIG. 4 is a flowchart illustrating the initial processing of a service request by the main unit according to one embodiment.

FIG. 4 is a flowchart illustrating the initial processing of a service request by a main unit of a resource pool manager, according to one embodiment. The main unit of the resource pool manager may receive a request for service 410 from a requestor. In response to receiving a request for service, the main unit may determine whether the request is a resource request 430, a statistics request 440, or a configuration request 420. A resource request may be a request for a pooled resource such a thread or a connections to a database, or a request to release previously obtained resource. Statistics requests may include requests for current resource pool usage statistics, requests to begin accumulating data for one or more cumulative statistics, requests to provide current values for one or more cumulative statistics, and requests to discontinue the accumulation of data for one or more cumulative statistics.

In an embodiment in which the resource pool is a connection pool, configuration requests may include, for example, requests for current values of the configuration parameters of the connection pool, requests to change the value of one or more configuration parameters of the connection pool, requests to flush the connection pool, and requests to destroy the connection pool. Connection pool configuration parameters may include: maximum wait queue size, maximum time in wait queue, initial connection pool size, maximum connection pool size, minimum connection pool size, connection reclaim time, and maximum connection idle time. The maximum wait queue size may determine the maximum number of requests for connection that may reside in the wait queue. The maximum time in wait queue may be used to determine how long a request for connection may reside in the wait queue before dropping the request and/or informing the requestor that a connection cannot be provided. The initial connection pool size may be used to determine the number of connections that the connection pool manager will generate upon initialization of the connection pool. The maximum pool size may be used to determine how many additional connections the connection pool manager may generate in response to connection requests above the number specified by the initial connection pool size parameter. The minimum connection pool size may be used to determine the number of connections maintained in the pool. Minimum connection pool size may be maintained once the pool reaches the minimum size. The connection reclaim time parameter may be used to determine the maximum length of time that a connection may be assigned to a requester. The maximum idle connection time parameter may be used to determine the maximum length of time that a connection, which is not in use, may stay in the pool for reassignment. This criteria may be applied for connections above the minimum connection pool size. Requests for service that do not correspond to one of the aforementioned types, or that contain invalid parameters may cause the connection pool manager to return an error message 450 to the requester without further processing.

Figure 5:
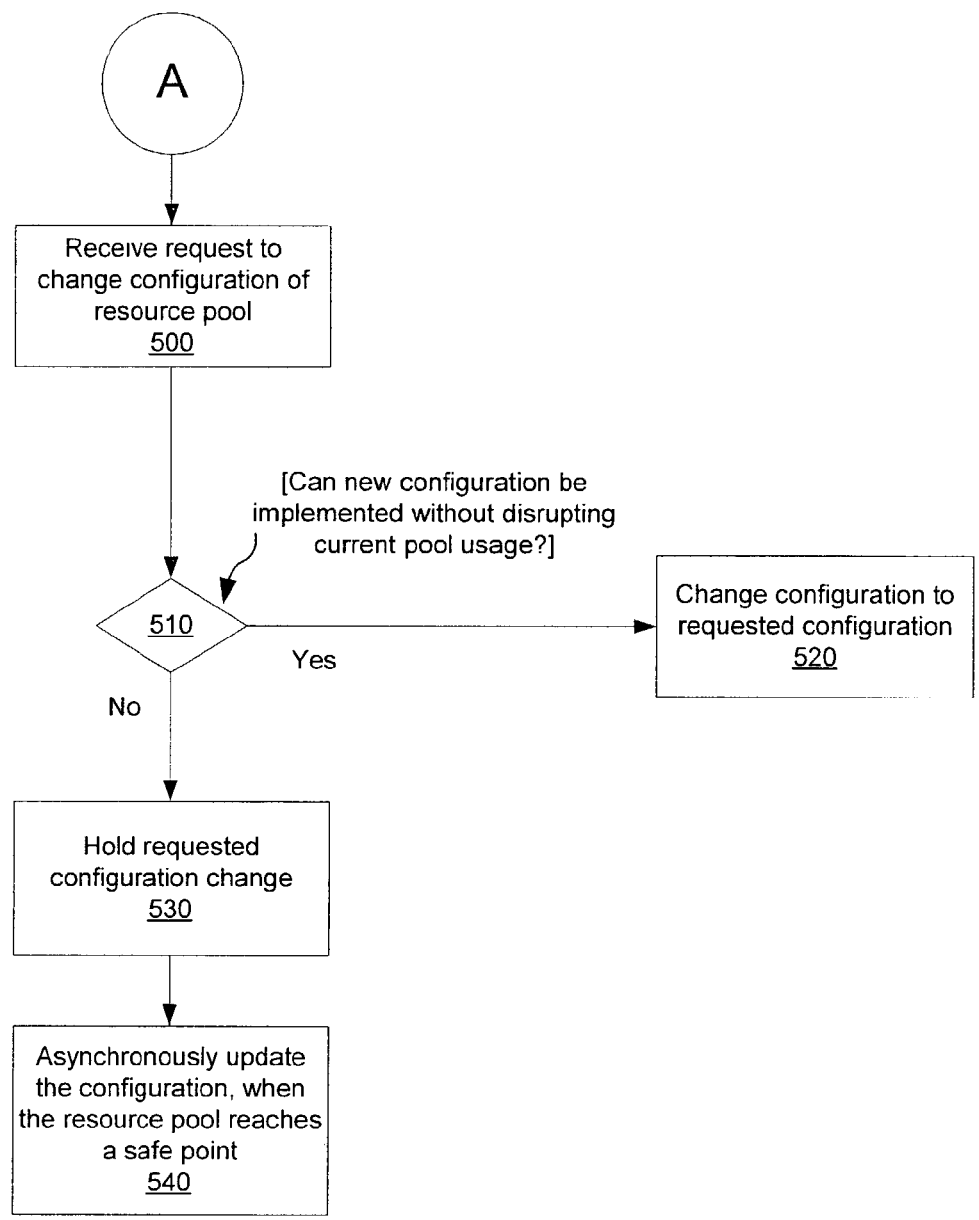
FIG. 5 is a flowchart illustrating the processing of a request to change the configuration of a dynamically configurable resource pool according to one embodiment.

FIG. 5 is a flowchart illustrating the processing of a request to change the configuration of a dynamically configurable resource pool according to one embodiment. Upon receiving a configuration change request 500, the main unit may determine 510 whether implementing the requested change would cause a disruption of the current pool usage. If the implementation of the requested configuration change would not disrupt current pool usage, the main unit may implement 520 the requested new configuration while current resource utilization continues undisturbed. If the implementation of the requested configuration change would disrupt current pool usage, the main unit may hold 530 the requested configuration change and asynchronously update 540 the configuration, when the resource pool reaches a safe point. The resource pool may be at a safe point when implementation of the held configuration change would cause no disruption of the current pool usage. Thus, changes to the resource pool configuration may be made dynamically, without disrupting service to requestors. Other configuration requests, such as requests to view the current configuration of the resource pool, to flush the resource pool, or to destroy the resource pool, may be implemented without performing a safe point check as described above for configuration change requests.

Figure 6:
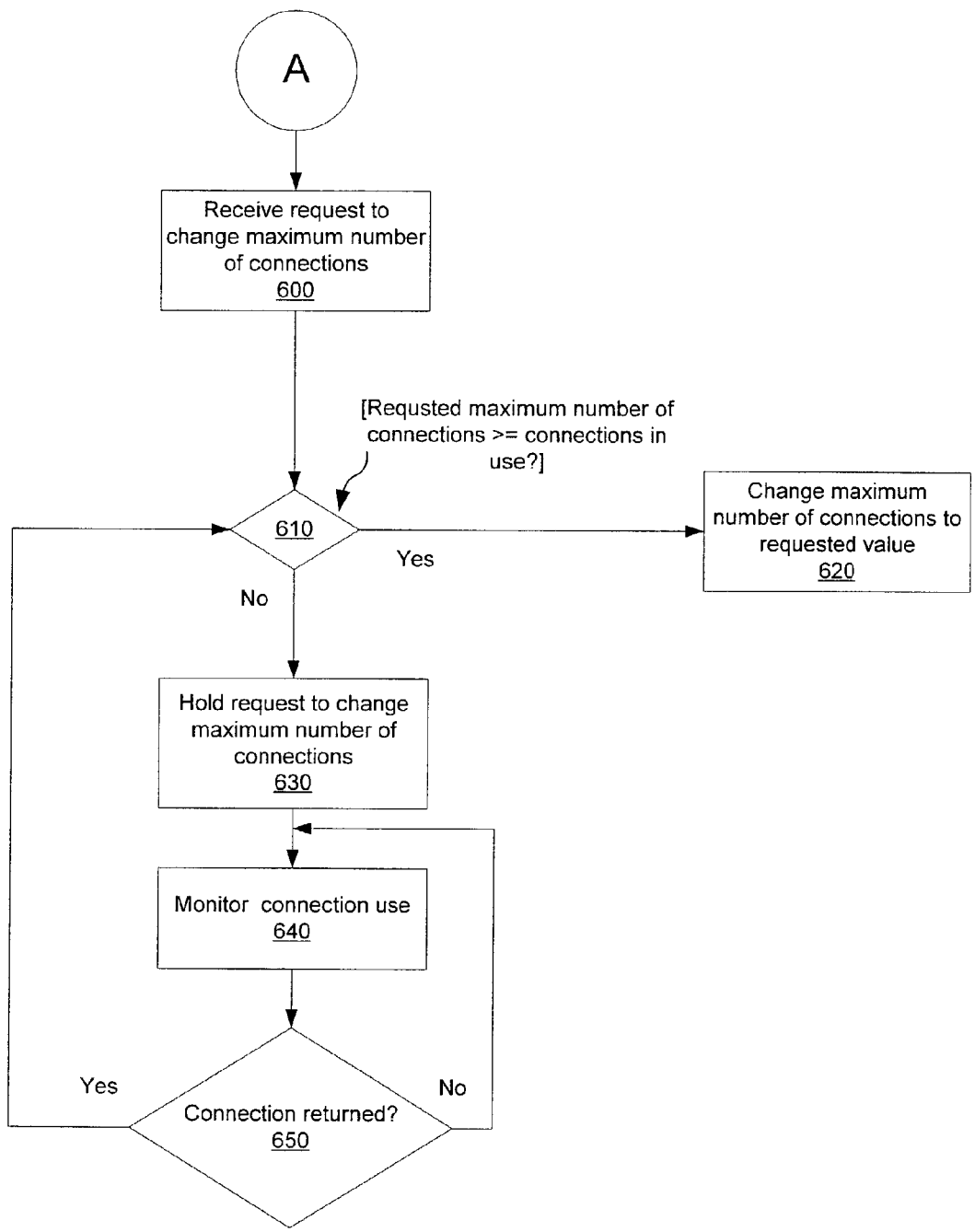
FIG. 6 is a flowchart illustrating the processing of a request to change the maximum number of connections of a dynamically configurable connection pool according to one embodiment.

An exemplary configuration request may be a request to change the maximum number of connections resident in a dynamically configurable connection pool. FIG. 6 is a flowchart illustrating the processing of a request to change the maximum number of connections according to one embodiment. Upon receiving the request 600, the main unit may compare the requested maximum number of connections with the number of connection currently in use 610 to determine if implementing the requested change would cause the destruction of any connections currently assigned to requesters.

If the requested maximum number of connections is greater than, or equal to the number of connections currently in use, then the maximum number of connections parameter may be changed to the requested maximum number of connections value 620 while all currently assigned connections continue to function without disruption.

If the requested maximum number of connections is less than the number of connections currently in use, then immediate implementation of the requested change may result in the destruction of one or more currently assigned connections and disruption of service to the requesters to which those connections are assigned. In order to avoid any disruption of service to requesters, the connection pool manager may delay the implementation of the requested change, store the change request 630, and begin monitoring changes in connection usage 640. When there is a decrease in the number of connections currently in use 650, the connection pool manager may once again determine whether the requested maximum number of connections is greater than, or equal to the number of connections currently in use. In this way changes to the connection pool configuration parameters may be made while one or more connections are in use, without disruption of service to requesters.

Similarly, in the case where a configuration change request may be a request to change the number of entries in the wait queue, the main unit may determine whether the requested number of entries for the wait queue is greater than or equal to the current size of the wait queue. If the requested wait queue size is less than the current number of connection requests on the wait queue, implementation of the configuration change would cause one or more queued connection requests to be lost. Therefore, the connection pool manager may delay implementation of the configuration change request until the number of connection requests pending in the wait queue is less than or equal to the number of wait queue entries indicated by the configuration change request.

Figure 7:
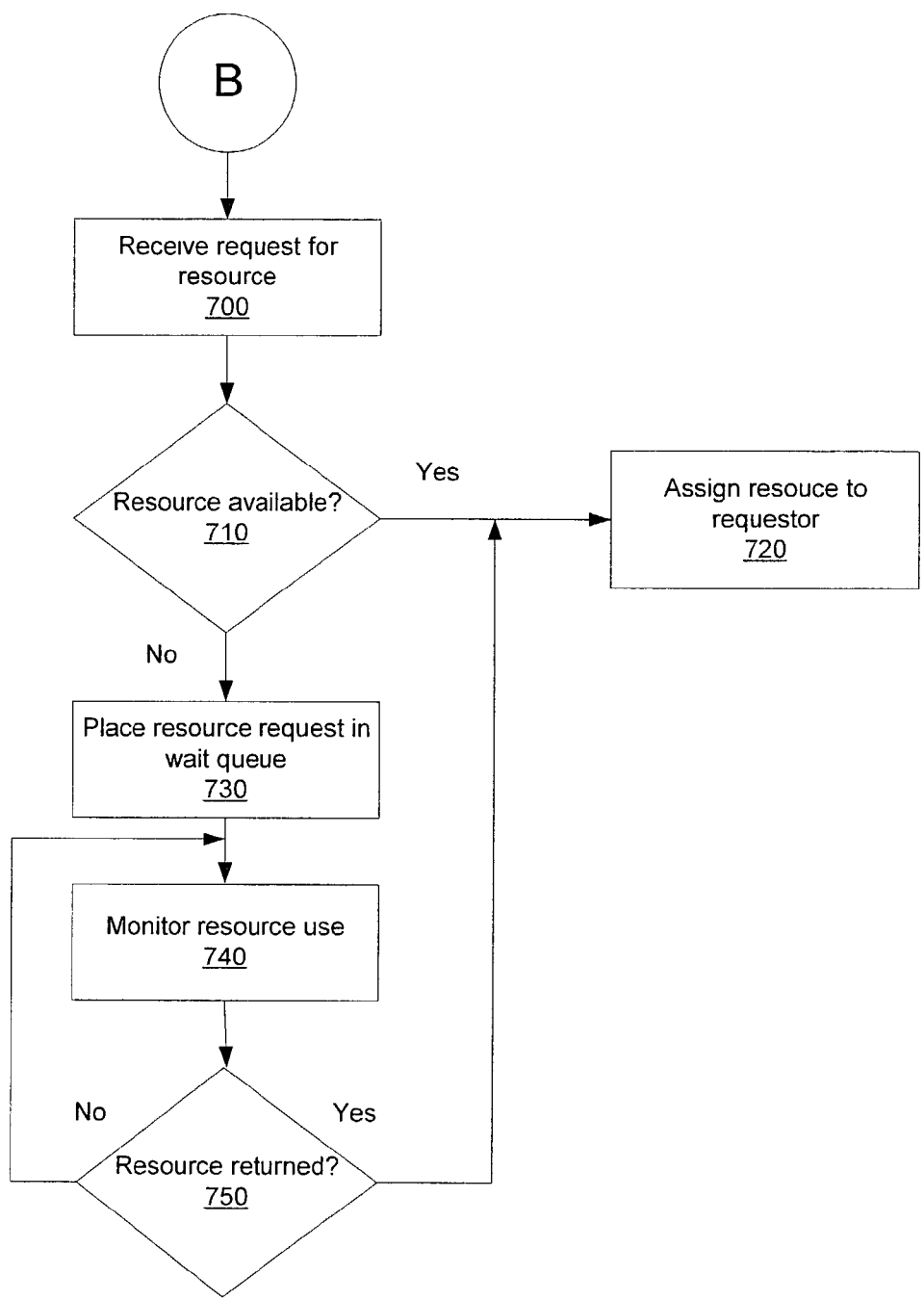
FIG. 7 is a flowchart illustrating the processing of a request for a resource from a dynamically configurable resource pool according to one embodiment.

FIG. 7 is a flowchart illustrating the processing of a request for a resource from a dynamically configurable resource pool according to one embodiment. Upon receiving a request for a connection 700, the main unit may determine 710 whether a resource is available in the pool. If a resource is available, the main unit may assign 720 the resource to the requester. If no resource is available, the wait queue unit may place 730 the request for a resource on the wait queue and monitor 740 resource usage. In response to the return of a resource to the pool 750, the wait queue unit may remove a queued request for resource from the wait queue and assign 720 the returned resource to the requestor.

Figure 8:
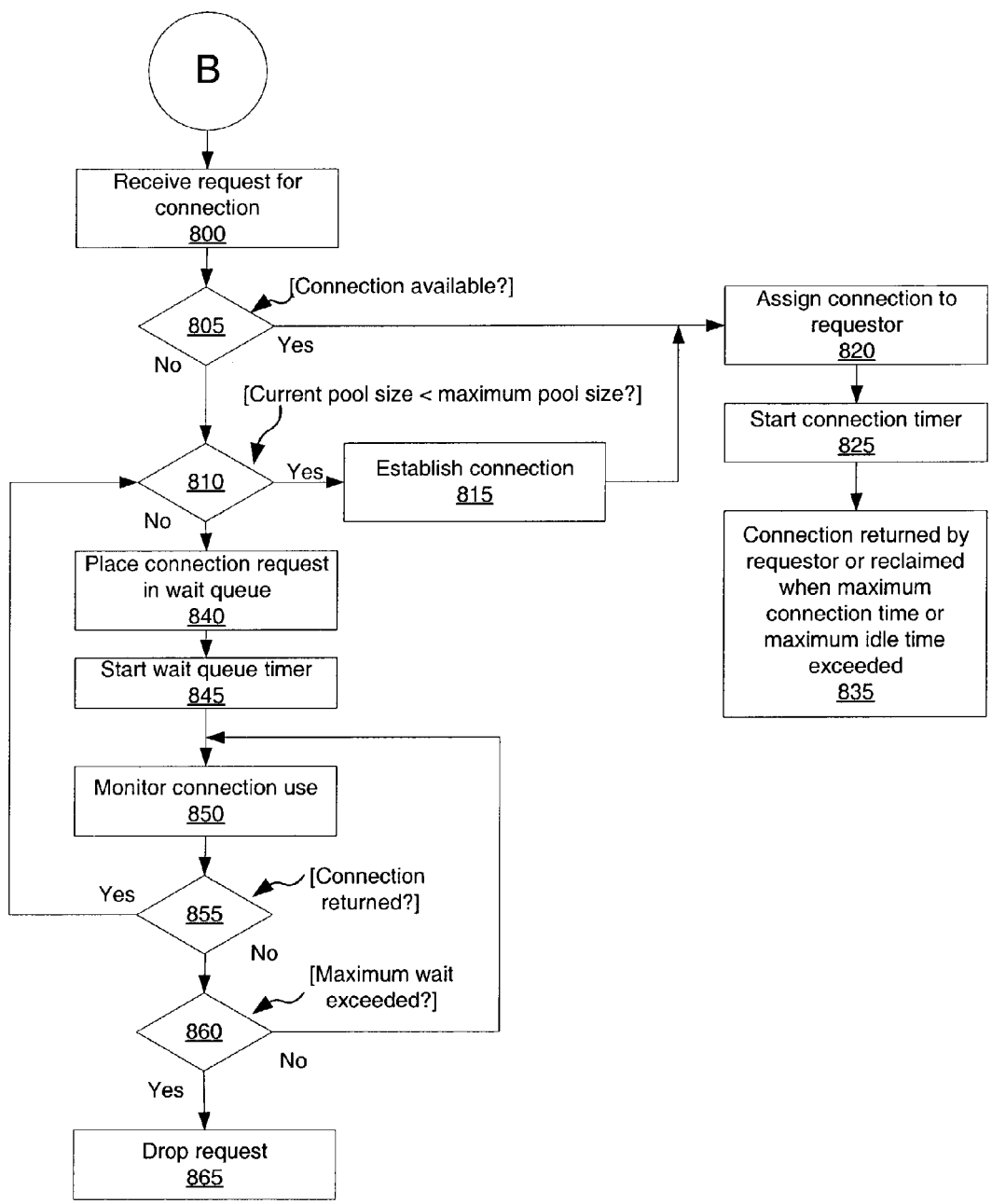
FIG. 8 is a flowchart illustrating the processing of a request for a connection from a dynamically configurable connection pool according to one embodiment.

An exemplary resource request may be a request to a dynamically configurable connection pool for a connection to a backend system. FIG. 8 is a flowchart illustrating the processing of a request for a connection according to one embodiment. Upon receiving a request for a connection 800, the main unit may determine 805 if a connection is available (e.g. not currently assigned to a requester) in the pool. In one embodiment, different connection polls may be provided for connections to different backend resources and the request for a connection may be made to the appropriate pool.

If an unassigned connection exists in the pool, the main unit may assign 820 the connection to the requester. Furthermore, if an unassigned connection does not exit in the pool, the main unit may compare 810 the current number of connections in the pool to the maximum number of connections that may be in the pool. If the current pool size is less than the maximum pool size, then the main unit may establish 815 a connection and assign 820 the connection to the requestor. When a connection is assigned to a requester, the main unit may initiate a timer to monitor the total time the connection is assigned to the requestor 825. The expiration of this timer may prompt the main unit to return 835 the connection to the pool as available for reassignment.

If an unassigned connection does not exist in the pool, and the current pool size is equal to the maximum pool size, then the wait queue unit may place the request for connection on the wait queue 840, start a timer to monitor the amount of time the request is resident on the wait queue 845, and monitor connection usage for the return of connections to the pool 850. When a connection is returned to the connection pool 855, the connection pool manager may once again determine if an unassigned connection exists in the pool to satisfy a pending request. In this way connection requests for which no connection is immediately available may be delayed until a connection becomes available rather than being refused. If the maximum wait time is exceeded before a connection can be assigned to a requester, the connection request may be dropped 865.

Figure 9:
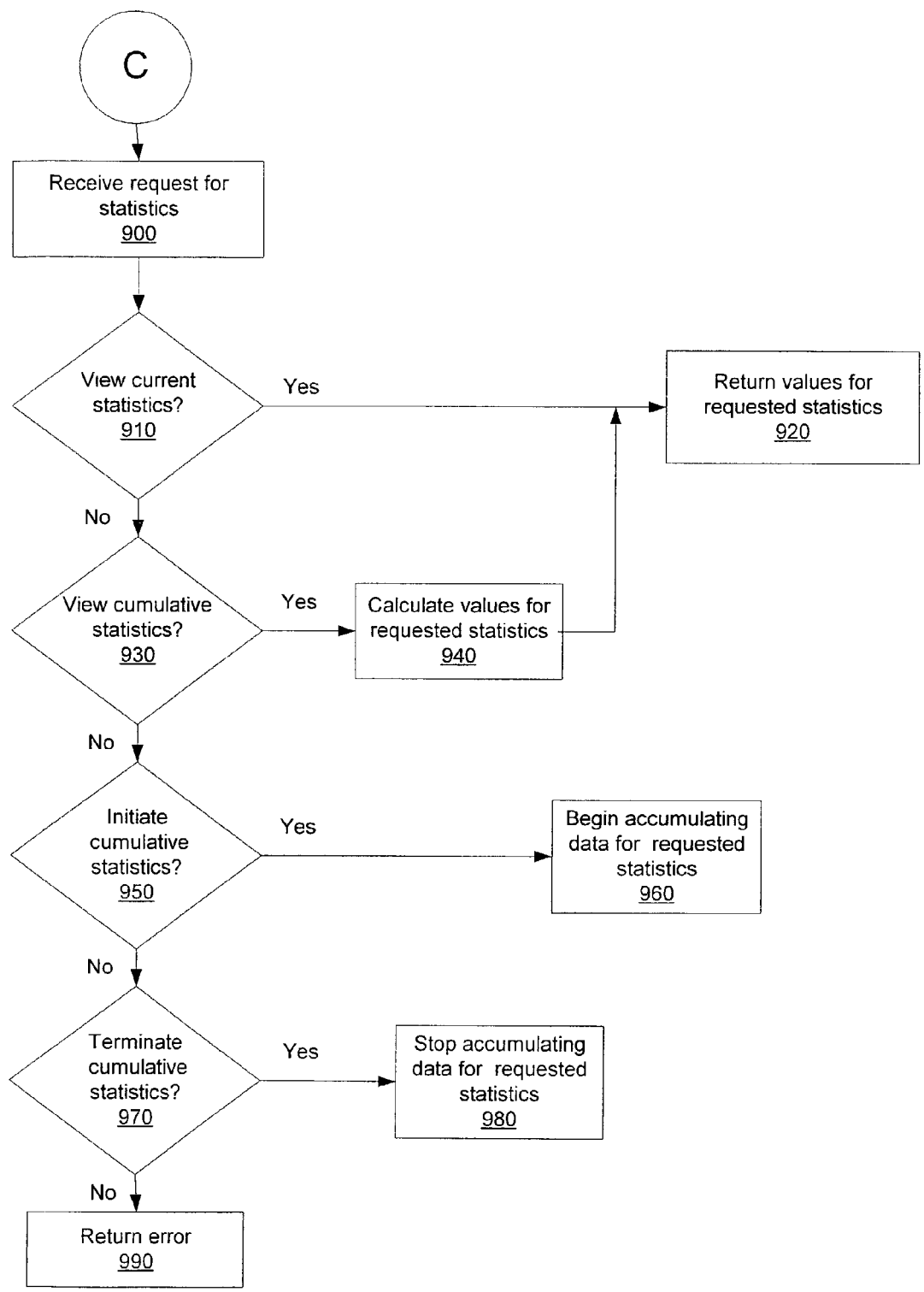
FIG. 9 is a flowchart illustrating the processing of a request for dynamically configurable resource pool statistics according to one embodiment.

Requests for resource pool statistics may include requests for current statistics and requests for cumulative statistics. FIG. 9 is a flowchart illustrating the processing of a request for dynamically configurable resource pool statistics according to one embodiment. Current statistics may include, for example, number of resources in the pool, number of resources in use, and number of resource requests on the wait queue. Upon receiving a request for statistics 900, the main unit may determine 910 whether the request is a request to view current statistics and if so, the main unit my respond by retuning 920 values for the requested statistics to the requester.

Cumulative statistics requests may be handled by the statistics unit of the connection pool manager. In response to a request to initiate 950 the accumulation of a peak value for a statistic, the statistics unit may store 960 the current value of the statistic in a separate location and monitor changes in the statistic. Upon the occurrence of a change in the statistic, the statistics logic may determine if the new value is greater than the stored value for the statistic 940. If the new value is greater than the stored value, the statistics unit may store the new value of the statistic. The statistics unit may provide the stored value 920 in response to a request to view cumulative statistics 930. In response to a request to initiate 950 the accumulation of a total value for occurrences of an event, the statistics unit may initialize a counter associated with the event 960 and monitor the occurrence of the event. Upon an occurrence of the event the statistics unit may increment the counter associated with the event. The statistics unit may provide the counter value 920 in response to a request for cumulative statistics. In response to a request to terminate 970 one or more cumulative statistics, the statistics unit may stop accumulating 980 data needed to calculate the one or more cumulative statistics. If the request for statistics is of an unsupported type or contains invalid parameters, an error may be reported to the requestor 990.

In the case of a dynamically configurable connection pool, cumulative statistics may include, for example, peak values for total connections in the pool, total connections in use, and wait queue size along with total number of cache hits, cache misses, connection requests, connections dropped, connections obtained after wait, connections dropped after wait, connections reclaimed, and connections dropped after idle time. Peak values may be the highest values that one or more parameters reach during the time interval from which accumulation begins until the time at which the cumulative statistics are requested. Cache hits may measure the number of requests for connections for which a connection is available in the pool. Likewise, cache misses may measure requests for connections for which a connection is not available in the pool. Connections dropped may be a cumulative measure of connection requests that could not be satisfied for any reason. Connections obtained after wait may be a cumulative measure of connection requests for which no connection is available at the time the request is received and further, the connection pool is at its maximum size so that the request is added to the wait queue. Subsequently, before the wait queue timer associated with this request expires, either a connection is returned to the pool, or the pool size falls below the maximum pool size allowing the establishment of a connection. In either case a connection is assigned to the requestor after the request has been resident in the wait queue. Connections reclaimed may be a cumulative measure of connections assigned to a requester for which the connection timer expires and the connection pool manager returns to the pool for reassignment. Connections dropped after idle time may be a cumulative measure of connections that are returned to the pool after the expiration of the connection idle timer.

In one embodiment a dynamically configurable resource pool may be a component of a multi-threaded application. In order to maintain synchronization among a plurality of threads within the application, the components of the resource pool may be locked by a thread in response to that thread issuing a request for service to the resource pool. For example, a thread A may issue a request for service to the resource pool, and concurrently a thread B may also issue a request for service to the resource pool.

If the resource pool manager were configured to be locked as a unit, the request issued by thread A would lock the resource pool while it was being serviced. Thread B would attempt to lock the resource pool for its own service request, but would have to wait until the pool finishes servicing the request of thread A to obtain the lock.

To improve system performance, the main unit, the wait queue unit, and the statistics unit may be configured to be locked independently. This may allow the resource pool manager to handle multiple, concurrent requests for service. Referring to the previous example, thread A may issue a resource request and lock the main unit and its associated resources. Concurrently, thread B may issue a cumulative statistics request and lock the statistics unit and its associated resources. Because the main unit and statistics unit may be locked independently, the two service requests can be fulfilled concurrently. Similarly, a request for cumulative statistics may be serviced concurrently with a request for current statistics, thus system performance may be improved.

Figure 10:
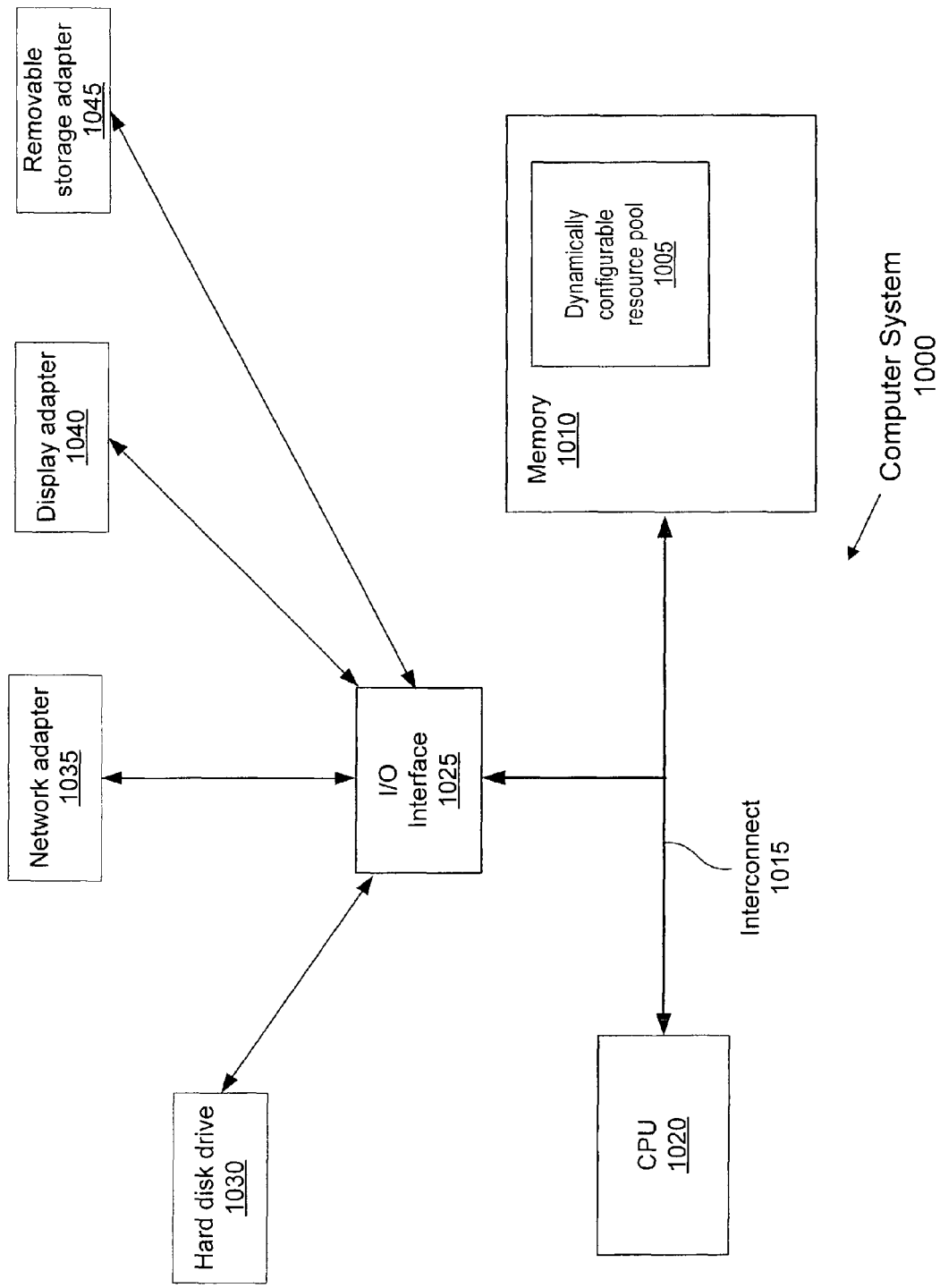
FIG. 10 illustrates one embodiment of a computer system that may include a dynamically configurable resource pool.

FIG. 10 illustrates one embodiment of a computer system 1000 that may include a dynamically configurable resource pool 1005. Computer system 1000 may include many different components such as memory 1010, a central processing unit (CPU) or processor 1020, and an input/output (I/O) interface 1025. Interconnect 1015 is relied upon to communicate data from one component to another. For example, interconnect 1015 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1000 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1030, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1000 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1010 may store program instructions accessed by the CPU 1020. For example, instructions and data implementing a dynamically configurable resource pool 1005 may be stored in memory 1010.

Computer system 1000 may further include other software and hardware components, such as an input/output (I/O) interface 1025, that may be coupled to various other components and memory 1010. The CPU 1020 may acquire instructions and/or data through the I/O interface 1025. Through the I/O interface 1025, the CPU 1020 may also be coupled to one or more I/O components. As illustrated, I/O components may include a hard disk drive 1030, a network adapter 1035, a display adapter 1040 and/or a removable storage adapter 1045. Some components 1030 to 1045 may be coupled to the I/O interface 1025. In addition, the computer system 1000 may include one or more of a particular type of component. The computer system 1000 may include one or more components coupled to the system through a component other than the I/O interface 1025. Some computer systems may include additional and/or other components than shown in FIG. 10 such as application software (e.g., stored in memory 1010), other CPUs, video monitors or other displays, track balls, mice, keyboards, printers, plotters, scanners, or other types of I/O devices for use with computer system 1000.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer system, comprising:
one or more computers, each of which comprises at least a processor and memory;
wherein the one or more computers are configured to implement:
a resource pool configured to provide a plurality of computing resources;
a plurality of requestors, wherein each of the plurality of requestors is configured to submit requests of a first type, wherein a request of the first type comprises a request for use of one of the computing resources from the resource pool, and wherein at least some of the plurality of requestors are further configured to submit requests of a second type, wherein a request of the second type is a configuration change request that comprises a request for a change to the value of a configuration parameter of the resource pool;
wherein the resource pool comprises a resource pool manager configured to service requests for use of the computing resources dependent on availability of the computing resources in the resource pool; and
wherein the resource pool manager is further configured to manage configuration of the resource pool, wherein in managing configuration of the resource pool the resource pool manager is configured to:
receive a configuration change request from one of the plurality of requestors, wherein the configuration change request comprises a request to change the value of a configuration parameter of the resource pool while the resource pool is available for use;
in response to said receiving the configuration change request, dynamically evaluate the configuration change request based on current usage of the resource pool to determine the impact of implementation of the requested change to the configuration parameter on the current usage of the resource pool; and
in response to determining that implementation of the requested change to the configuration parameter would disrupt the current usage of the resource pool, delay implementation of the requested change to the configuration parameter until the requested change to the configuration parameter can be implemented without disrupting usage of the resource pool.

2. The system as recited in claim 1, wherein, in response to determining that implementation of the requested change to the configuration parameter would not disrupt the current usage of the resource pool, the resource pool manager is configured to perform the requested change to the configuration parameter for the resource pool while the resource pool is available for use.

3. The system as recited in claim 1, wherein the resource pool comprises a connection pool, and wherein the computing resources comprise connections to one or more backend systems.

4. The system as recited in claim 1, wherein the resource pool comprises a thread pool.

5. The system as recited in claim 3, wherein the one or more backend systems comprise one or more databases, wherein one or more of the connections of the connection pool are database connections.

6. The system as recited in claim 3, wherein the configuration change request comprises a request to change the value of a configuration parameter representing the maximum number of connections for the connection pool.

7. The system as recited in claim 3, wherein the connection pool manager comprises a wait queue, wherein in response to receiving a request for a connection when the connection pool is at a maximum size and none of the connections are available, the connection pool manager is configured to store the request in the wait queue.

8. The system as recited in claim 3, wherein the connection pool manager is further configured to provide statistics on current usage of the connection pool.

9. The system as recited in claim 3, wherein the connection pool manager comprises:

a main unit configured to service connection requests and configuration change requests for the connection pool;

a wait queue unit coupled to the main unit and configured to queue connection requests when the connection pool is at a maximum size and none of the connections are available; and a statistics unit configured to calculate cumulative usage statistics for the connection pool.

10. The system as recited in claim 6, wherein, in response to determining that implementation of the request to change the value of the configuration parameter representing the maximum number of connections would cause one or more connections currently in use to be lost, the connection pool manager is configured to delay implementation of the request to change the value of the configuration parameter representing the maximum number of connections until the number of connections currently in use is less than or equal to a maximum number of connections indicated in the configuration change request.

11. The system as recited in claim 7, wherein the configuration change request comprises a request to change the value of a configuration parameter representing the number of entries in the wait queue.

12. The system as recited in claim 9, wherein the plurality of requestors execute within a multi-threaded environment, wherein the main unit, the wait queue unit, and the statistics unit are each configured to be locked separately to synchronize concurrent requests to the connection pool.

13. The system as recited in claim 9, wherein the statistics unit is configured to provide one or more of the cumulative usage statistics for the connection pool in response to a cumulative statistic request.

14. The system as recited in claim 11, wherein, in response to determining that implementation of the request to change the value of the configuration parameter representing the number of entries in the wait queue would cause one or more pending connection requests in the wait queue to be lost, the connection pool manager is configured to delay implementation of the request to change the value of the configuration parameter representing the number of entries in the wait queue until the number of connection requests pending in the wait queue is less than or equal to a number of wait queue entries indicated by the configuration change request.

15. The system as recited in claim 13, wherein the statistics unit and main unit are configured to respond concurrently to cumulative statistic requests and connection requests respectively.

16. The system as recited in claim 13, wherein the main unit is configured to provide current statistics for connection pool usage.

17. A method, comprising:
using one or more computers to perform:
initiating a resource pool for providing a plurality of computing resources to a plurality of requestors, wherein each of the plurality of requestors is configured to submit requests of a first type, wherein a request of the first type comprises a request for use of one of the computing resources from the resource pool, and wherein at least some of the plurality of requestors are further configured to submit requests of a second type, wherein a request of the second type is a configuration change request that comprises a request for a change to the value of a configuration parameter of the resource pool;

providing computing resources from the resource pool to the plurality of requestors in response to requests for use of the computing resources of the resource pool dependent on availability of the computing resources in the resource pool;

receiving a configuration change request from one of the plurality of requestors, wherein the configuration change request comprises a request to change the value of a configuration parameter of the resource pool while the resource pool is available for use;

in response to said receiving the configuration change request, dynamically evaluating the configuration change request based on current usage of the resource pool to determine the impact of implementation of the requested change to the configuration parameter on the current usage of the resource pool;

in response to determining that implementation of the requested change to the configuration parameter would disrupt the current usage of the resource pool, delaying implementation of the requested change to the configuration parameter until the requested change to the configuration parameter can be implemented without disrupting usage of the resource pool.

18. The method as recited in claim 17, further comprising using the computer to perform, in response to determining that implementation of the requested change to the configuration parameter would not disrupt the current usage of the resource pool, performing the requested change to the configuration parameter for the resource pool while the resource pool is available for use.

19. The method as recited in claim 17, wherein the resource pool comprises a connection pool, and wherein the computing resources comprise connections to one or more backend systems.

20. The method as recited in claim 19, wherein the one or more backend systems comprise one or more databases, wherein one or more of the connections of the connection pool are database connections.

21. The method as recited in claim 19, wherein the configuration change request comprises a request to change the value of a configuration parameter representing the maximum number of connections for the connection pool.

22. The method as recited in claim 19, wherein the connection pool manager comprises a wait queue, the method further comprising in response to receiving a request for a connection when the connection pool is at a maximum size and none of the connections are available, storing the request in the wait queue.

23. The method as recited in claim 19, further comprising using the computer to perform providing statistics on current usage of the connection pool.

24. The method as recited in claim 19, further comprising using the computer to perform:
a main unit servicing connection requests and configuration change requests for the connection pool;
a wait queue unit coupled to the main unit queuing connection requests when the connection pool is at a maximum size and none of the connections are available; and
a statistics unit calculating cumulative usage statistics for the connection pool.

25. The method as recited in claim 17, wherein the resource pool comprises a thread pool.

26. The method as recited in claim 21, further comprising using the computer to perform, in response to determining that implementation of the request to change the value of the configuration parameter representing the maximum number of connections would cause one or more connections currently in use to be lost, delaying implementation of the request to change the value of the configuration parameter representing the maximum number of connections until the number of connections currently in use is less than or equal to a maximum number of connections indicated in the configuration change request.

27. The method as recited in claim 22, wherein the configuration change request comprises a request to change the value of a configuration parameter representing the number of entries in the wait queue.

28. The method as recited in claim 24, wherein the plurality of requestors execute within a multi-threaded environment, the method further comprising using the computer to perform locking the main unit, the wait queue unit, and the statistics unit separately to synchronize concurrent requests to the connection pool.

29. The method as recited in claim 24, further comprising using the computer to perform providing one or more of the cumulative usage statistics for the connection pool in response to a cumulative statistic request.

30. The method as recited in claim 27, further comprising using the computer to perform, in response to determining that implementation of the request to change the value of the configuration parameter representing the number of entries in the wait queue would cause one or more pending connection requests in the wait queue to be lost, delaying implementation of the request to change the value of the configuration parameter representing the number of entries in the wait queue until the number of connection requests pending in the wait queue is less than or equal to a number of wait queue entries indicated by the configuration change request.

31. The method as recited in claim 29, further comprising using the computer to perform responding concurrently to cumulative statistic requests and connection requests respectively.

32. The method as recited in claim 29, further comprising using the computer to perform providing current statistics for connection pool usage.

33. A non-transitory, tangible, computer-readable storage medium comprising program instructions configured to enable computer operations comprising:
    initiating a resource pool for providing a plurality of computing resources to a plurality of requestors, wherein each of the plurality of requestors is configured to submit requests of a first type, wherein a request of the first type comprises a request for use of one of the computing resources from the resource pool, and wherein at least some of the plurality of requestors are further configured to submit requests of a second type, wherein a request of the second type is a configuration change request that comprises a request for a change to the value of a configuration parameter of the resource pool;
    providing computing resources from the resource pool to the plurality of requestors in response to requests for use of the computing resources of the resource pool dependent on availability of the computing resources in the resource pool;
    receiving a configuration change request from one of the plurality of requestors, wherein the configuration change request comprises a request to change the value of a configuration parameter of the resource pool while the resource pool is available for use;
    in response to said receiving the configuration change request, dynamically evaluating the configuration change request based on current usage of the resource pool to determine the impact of implementation of the requested change to the configuration parameter on the current usage of the resource pool; and
    in response to determining that implementation of the requested change to the configuration parameter would disrupt the current usage of the resource pool, delaying implementation of the requested change to the configuration parameter until the requested change to the configuration parameter can be implemented without disrupting usage of the resource pool.

34. The non-transitory, tangible, computer-readable storage medium as recited in claim 33, wherein the program instructions are configured to enable computer operations further comprising, in response to determining that implementation of the requested change to the configuration parameter would not disrupt the current usage of the resource pool, performing the requested change to the configuration parameter for the resource pool while the resource pool is available for use.

35. The non-transitory, tangible, computer-readable storage medium as recited in claim 33, wherein the resource pool comprises a connection pool, and wherein the computing resources comprise connections to one or more backend systems.

36. The non-transitory, tangible, computer-readable storage medium as recited in claim 33, wherein the resource pool comprises a thread pool.

37. The non-transitory, tangible, computer-readable storage medium as recited in claim 35, wherein the one or more backend systems comprise one or more databases, wherein one or more of the connections of the connection pool are database connections.

38. The non-transitory, tangible, computer-readable storage medium as recited in claim 35, wherein the configuration change request comprises a request to change the value of a configuration parameter representing the maximum number of connections for the connection pool.

39. The non-transitory, tangible, computer-readable storage medium as recited in claim 35, wherein the connection pool manager comprises a wait queue, wherein the program instructions are configured to enable computer operations further comprising in response to receiving a request for a connection when the connection pool is at a maximum size and none of the connections are available, storing the request in the wait queue.

40. The non-transitory, tangible, computer-readable storage medium as recited in claim 35, wherein the program instructions are configured to enable computer operations further comprising providing statistics on current usage of the connection pool.

41. The non-transitory, tangible, computer-readable storage medium as recited in claim 35, wherein the program instructions are configured to enable computer operations further comprising:
    a main unit servicing connection requests and configuration change requests for the connection pool;
    a wait queue unit coupled to the main unit queuing connection requests when the connection pool is at a maximum size and none of the connections are available; and
    a statistics unit calculating cumulative usage statistics for the connection pool.

42. The non-transitory, tangible, computer-readable storage medium as recited in claim 38, wherein the program instructions are configured to enable computer operations further comprising, in response to determining that implementation of the request to change the value of the configuration parameter representing the maximum number of connections would cause one or more connections currently in use to be lost, delaying implementation of the request to change the value of the configuration parameter representing the maximum number of connections until the number of connections currently in use is less than or equal to a maximum number of connections indicated in the configuration change request.

43. The non-transitory, tangible, computer-readable storage medium as recited in claim 39, wherein the configuration change request comprises a request to change the value of a configuration parameter representing the number of entries in the wait queue.

44. The non-transitory, tangible, computer-readable storage medium as recited in claim 41, wherein the plurality of requestors execute within a multi-threaded environment, wherein the program instructions are configured to enable computer operations further comprising locking the main unit, the wait queue unit, and the statistics unit separately to synchronize concurrent requests to the connection pool.

45. The non-transitory, tangible, computer-readable storage medium as recited in claim 41, wherein the program instructions are configured to enable computer operations further comprising providing one or more of the cumulative usage statistics for the connection pool in response to a cumulative statistic request.

46. The non-transitory, tangible, computer-readable storage medium as recited in claim 43, wherein the program instructions are configured to enable computer operations further comprising, in response to determining that implementation of the request to change the value of the configuration parameter representing the number of entries in the wait queue would cause one or more pending connection requests in the wait queue to be lost, delaying implementation of the request to change the value of the configuration parameter representing the number of entries in the wait queue until the number of connection requests pending in the wait queue is less than or equal to a number of wait queue entries indicated by the configuration change request.

47. The non-transitory, tangible, computer-readable storage medium as recited in claim 45, wherein the program instructions are configured to enable computer operations further comprising responding concurrently to cumulative statistic requests and connection requests respectively.

48. The non-transitory, tangible, computer-readable storage medium as recited in claim 45, wherein the program instructions are configured to enable computer operations further comprising providing current statistics for connection pool usage.

\* \* \* \* \*